United States P
Pinzone et al.

3,846,809
Nov. 5, 1974

[54] REFLECTORS AND MOUNTS FOR PANORAMIC OPTICAL SYSTEMS

[76] Inventors: Joseph A. Pinzone, 829 Bushwick Ave., Brooklyn, N.Y. 11221; Gerald J. Troje, 1719 Centre St., Ridgewood, N.Y. 11227; Edward L. Schiavone, 10502 Insley St., Silver Spring, Md. 20902

[22] Filed: Oct. 18, 1973

[21] Appl. No.: 407,588

[52] U.S. Cl. .................................. 354/95, 352/69
[51] Int. Cl. ............................................ G03b 37/00
[58] Field of Search ............... 95/15, 16, 17; 352/69; 354/95

[56] References Cited
UNITED STATES PATENTS

| | | | |
|---|---|---|---|
| 994,935 | 6/1911 | Kleinschmidt | 95/15 |
| 2,371,495 | 3/1945 | Benford | 95/15 |
| 2,737,864 | 3/1956 | Gutterman | 95/15 X |

*Primary Examiner*—John M. Horan

[57] ABSTRACT

A system of frusto-conical and hemispherical reflectors mounted on supporting structures for attachment to the interior or exterior of a camera lens barrel to provide panoramic viewing. A peripherally adjustable sunshade and a rain protector may be provided. The reflectors may be adjustably positioned with respect to the camera lens.

8 Claims, 6 Drawing Figures

PATENTED NOV 5 1974
3,846,809
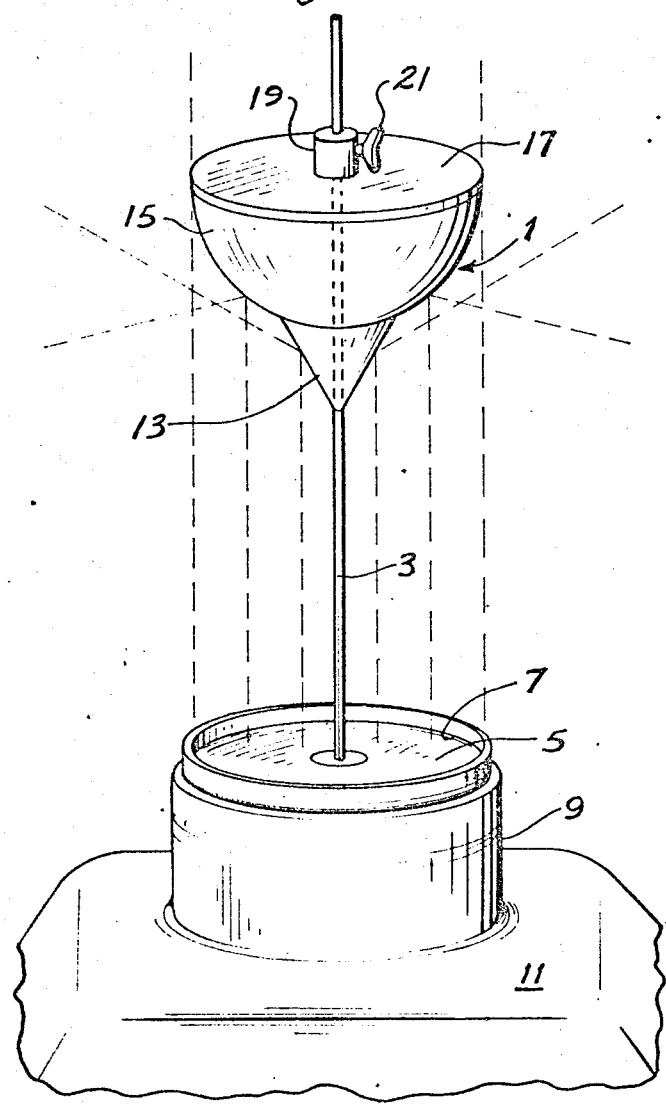
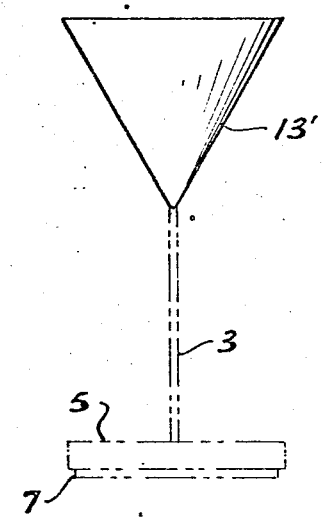
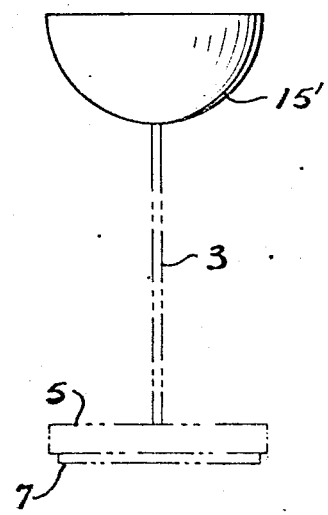

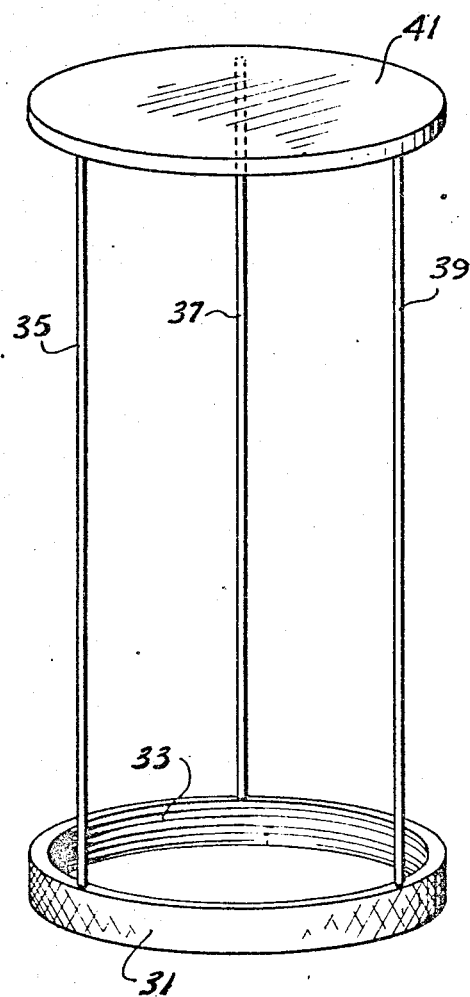
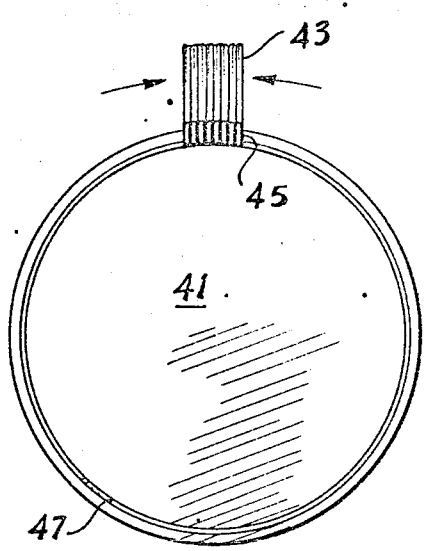
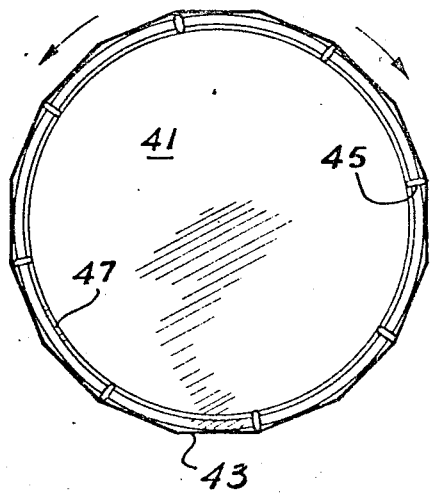

REFLECTORS AND MOUNTS FOR PANORAMIC OPTICAL SYSTEMS

CROSS-REFERENCES TO RELATED APPLICATIONS

"Optical System for Panoramic Projection", Troje et al., Ser. No. 335,166, filed Feb. 23, 1973

BACKGROUND OF THE INVENTION

Motion pictures have long been a popular source of entertainment for the public. The visual effect of motion pictures is made possible by the property of persistence of vision of the human eye whereby the observer who sees a sequence of still pictures of an action receives the impression of seeing a continuous motion. Progress has been made from the early silent films with little or no camera techniques and subleties to the present day large screen productions with sterophonic sound and camera techniques that defy the imagination.

It has long been a desired objective to reproduce a filmed scene in panoramic vision in which the screen completely surrounds the observer in a circle allowing a 360° image with the observer in the middle. The peripheral vision of the human eye greatly influences the impressions formed, and observers of a panoramic picture who are located at or near the center of curvature of the screen experience a depth effect forcefully created in their minds. This effect is formed both from directly viewing the main action of the picture and from the indirect side views of scenery of lesser interest. The depth effect can be greatly enhanced by synchronization of the action portrayed with stereophonic sound which can be made clearly to convey the sensation of motion in conjunction with moving objects on the pictured scene.

In the copending application by the present inventors for "Optical System for Panoramic Projection", Ser. No. 335,166, filed Feb. 23, 1973 an improved system for producing a 360° image on a circular screen surrounding an audience is described. That system deals primarily with the problem of projecting a recorded image upon a panoramic screen. The assembly of frusto-conical reflectors shown therein is not readily adaptable for use on camera to produce the recorded image.

The mounting of lenses and reflectors for operation on panoramic cameras has always been a problem because the supports for mounting have produced obstructions and distortions in the recorded images. In the past it has been customary either to compromise the quality of the recorded image or to work with complicated and bulky camera apparatus which has severly restricted the flexibility of operation and limited the versatility of the equipment.

SUMMARY OF THE INVENTION

With these problems in mind the present invention has for its principal object the provision of a system of reflectors and supporting structures which may be mounted conveniently as an extension of the existing camera lenses without attachments and modification structures of unnecessary bulk. The supporting structures are designed to be attached to the camera lens barrel in the same fashion as conventional internally and externally threaded adaptors.

The features of the invention are realized in a system of frusto-conical and hemispherical optically-reflective surfaces arranged singly or in combination in adjustable relationship to the camera lens to enable the optical recording of panoramic scenes.

DESCRIPTION OF THE DRAWINGS

FIG. 1 is a perspective view of one embodiment of reflector showing a combination frusto-conical-hemispherical reflector adjustably mounted on a camera lens barrel;

FIG. 2 is an elevation view of a frusto-conical reflector;

FIG. 3 is an elevation view of an hemispherical reflector;

FIG. 4 is a perspective view of an alternative support structure;

FIG. 5 is a plan view of an adjustable shade in open position which may be mounted on the reflectors; and FIG. 6 is a plan view of the shade of FIG. 5 in fully closed position.

The invention will be understood more readily by referring to the drawings in which FIG. 1 is a perspective view showing a reflector 1 slidably mounted on a slender transparent stem member 3. Stem member 3 is fixed to and in perpendicular relationship to a transparent disc 5 which is externally threaded at 7 to screw into the lens barrel 9 of camera 11.

Reflector 1 is of composite shape and includes two surfaces of revolution, a frusto-conical portion 13 and an hemispherical portion 15. The surfaces of the reflector 1 are so oriented that incoming light rays (shown in dotted line form) are reflected along the axis of the camera which is concentric with the axis of the surfaces of revolution. The stem 3 does not interfere with the reflected light and a complete picture of the panorama is thereby formed on the camera film.

The reflector 1 is fixed to a protective disc 17 which has an integral collar 19 and threaded wing-screw 21 to enable adjustment of reflector along stem 3. An alternative arrangement for adjustably positioning reflector 1 would be to provide stem 3 with telescoping sections.

FIGS. 2 and 3 show reflector forms 13' and 15' in frusto-conical and hemispherical forms, respectively. All of the reflectors shown may be fixed in position on stem 3 or mounted adjustably as shown in FIG. 1.

FIG. 4 shows an alternative support arrangement comprising a ring 31 having internal threads 33 designed to screw onto the lens barrel of a camera and to be attached thereto. Three transparent stems 35, 37, 39 connect ring 31 to disc 41 which is used to mount the reflector elements in the same relationship as shown by disc 17 of FIG. 1.

FIGS. 5 and 6 show disc 41 with a collapsible shade element 43 attached thereto for peripheral movement between open and closed positions or any desired intermediate position. The shade element 43 may be attached to disc 41 by means of hooks which slide in a recessed track 47.

What is claimed is:

1. In an optical system for recording panoramic images with a photographic camera having a lens mounted within a lens barrel the combination comprising a reflector containing a surface of revolution, the axis of said surface of revolution being concentric with the viewing axis of said camera, and said surface of revolution being so oriented with respect to said camera lens as to reflect a view of the panorama along said camera axis, means for mounting said reflector in spaced position in front of the lens of said camera, said means for mounting comprising at least one transparent stem member having one end adapted for connection to the lens barrel of the camera and the other end adapted to support said reflector, whereby said camera can record a panoramic image 2. The combination according to claim 1 wherein said reflector is frusto-conical in shape.

3. The combination according to claim 1 wherein said reflector is hemispherical in shape.

4. The combination according to claim 1 wherein said reflector is a combination of frustoconical and hemispherical shapes.

5. The combination according to claim 4 including means to adjust the position of said reflector along the camera axis.

6. The combination according to claim 1 wherein said mounting means comprises a single transparent stem member connected to a transparent disc having external threads adapted to screw into the barrel of the camera lens barrel.

7. The combination according to claim 1 wherein said mounting means comprises a plurality of transparent stem members having one end connected to an internally threaded ring member adapted to screw onto the barrel of the camera lens barrel.

8. The combination according to claim 7 including a disc member supported by the other ends of said transparent stem members, said disc member having peripheral means for mounting peripherally extendable shade means to block out selected portions of the panoramic view.

* * * * *